(12) United States Patent
Gabin et al.

(10) Patent No.: US 12,204,733 B2
(45) Date of Patent: Jan. 21, 2025

(54) AUTOMATED GENERATION OF NETWORK DATA VISUALIZATION DASHBOARDS

(71) Applicant: AT&T Intellectual Property I, L.P., Atlanta, GA (US)

(72) Inventors: Jay Gabin, Dexter, ME (US); Susan Kennedy, Newport News, VA (US); Stephanie Parlamas, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/664,683

(22) Filed: May 24, 2022

(65) Prior Publication Data

US 2023/0384904 A1  Nov. 30, 2023

(51) Int. Cl.
*G06F 3/048* (2013.01)
*G06F 3/0481* (2022.01)
*H04L 43/045* (2022.01)

(52) U.S. Cl.
CPC .......... *G06F 3/0481* (2013.01); *H04L 43/045* (2013.01)

(58) Field of Classification Search
CPC .............................. G06F 3/0481; H04L 43/045
See application file for complete search history.

(56) References Cited

U.S. PATENT DOCUMENTS

| 11,144,336 B1* | 10/2021 | Hu | G06F 9/451 |
| 2007/0130541 A1* | 6/2007 | Louch | G06F 3/04817 715/804 |
| 2015/0153918 A1* | 6/2015 | Chen | G06Q 10/0639 715/771 |
| 2018/0081935 A1* | 3/2018 | Papale | G06F 16/245 |

OTHER PUBLICATIONS

"About Grafana dashboards," Grafana Labs, https://grafana.com/docs/grafana/latest/dashboards/?pg=dashboards&plcmt=hero-btn2, accessed May 2, 2022, 5 pages.

* cited by examiner

*Primary Examiner* — Aleksey Olshannikov
*Assistant Examiner* — Alex Olshannikov

(57) ABSTRACT

The described technology is generally directed towards automated generation of network data visualization dashboards. Automation can be achieved through the use of templates and data files. Templates can be combined with any of multiple different data files to produce network data visualization dashboard files. Different combinations of templates and different data files can result in different network data visualization dashboard files. The network data visualization dashboard files can be provided to a data visualization tool, platform, or service, which can generate network data visualization dashboards according to received network data visualization files.

20 Claims, 10 Drawing Sheets

```
                                                    Template File
Template ID                                              400
Panel 1
        - Fixed Panel Property A
        - {Customizable Panel Property: Parameter Formulation BC}
        - Fixed Panel Property D
        - {Customizable Panel Property: Parameter Formulation EF}
        - Fixed Panel Property G {Customizable Panel Property: Parameter H}
                Fixed Panel Property I {Customizable Panel Property:
                Parameter J}
        - Fixed Panel Property K {Customizable Panel Property: Parameter L}
Panel 2
        - Fixed Panel Property M
        - {Customizable Panel Property: Parameter Formulation CE}
        - Fixed Panel Property N
        - {Customizable Panel Property: Parameter Formulation BF}
Panel 3
        ...
```

FIG. 4

```
                                                      Data File
                                                         500
Data File ID
        Parameter B: intra-pod
        Parameter C: 10.67.14.148
        Parameter E: C-AGG-LEAF-2A
        Parameter F: ipv4
        Parameter H: zrdm54bnamp01amp001
        Parameter J: rdm541922ell
        Parameter L: 10.67.14.149
```

FIG. 5

AUTOMATED GENERATION OF NETWORK DATA VISUALIZATION DASHBOARDS

TECHNICAL FIELD

The subject application is related to data visualization and monitoring, and more particularly, to visualization and monitoring of network data, e.g., via a dashboard.

BACKGROUND

Communication networks, such as the AT&T network and others, produce an enormous volume and variety of network data. Network data can be logged, monitored, and used by network operators to understand, troubleshoot and improve network operations.

A variety of data visualization tools and platforms exist to help with visualizing data in general, and to visualize network data in particular. For example, data visualization tools can facilitate generating charts and graphs showing network data as a function of time or showing network data as a function of other variables (including other network data). One example data visualization platform is the dashboard platform provided by Grafana Labs Corporation of New York, New York.

While the utility of data visualization tools and platforms is clear, the adaptability of available data visualization tools and platforms can also lead to unwanted complexity and errors, for example when setting up new data visualizations. New data visualizations may be needed, e.g., when data centers that host network elements are deployed and modified. Dozens of different data visualizations may be desired and creating them by hand is cumbersome and error prone. It is feasible to make copies of previous data visualizations and hand edit them; however, this approach is time consuming and can easily lead to errors and oversights.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 illustrates an example template file comprising fixed panel properties and customizable panel properties, in accordance with various aspects and embodiments of the subject disclosure.

FIG. 5 illustrates an example data file comprising parameters for insertion into a template file in order to generate a dashboard file, in accordance with various aspects and embodiments of the subject disclosure.

DETAILED DESCRIPTION

Figure 1:
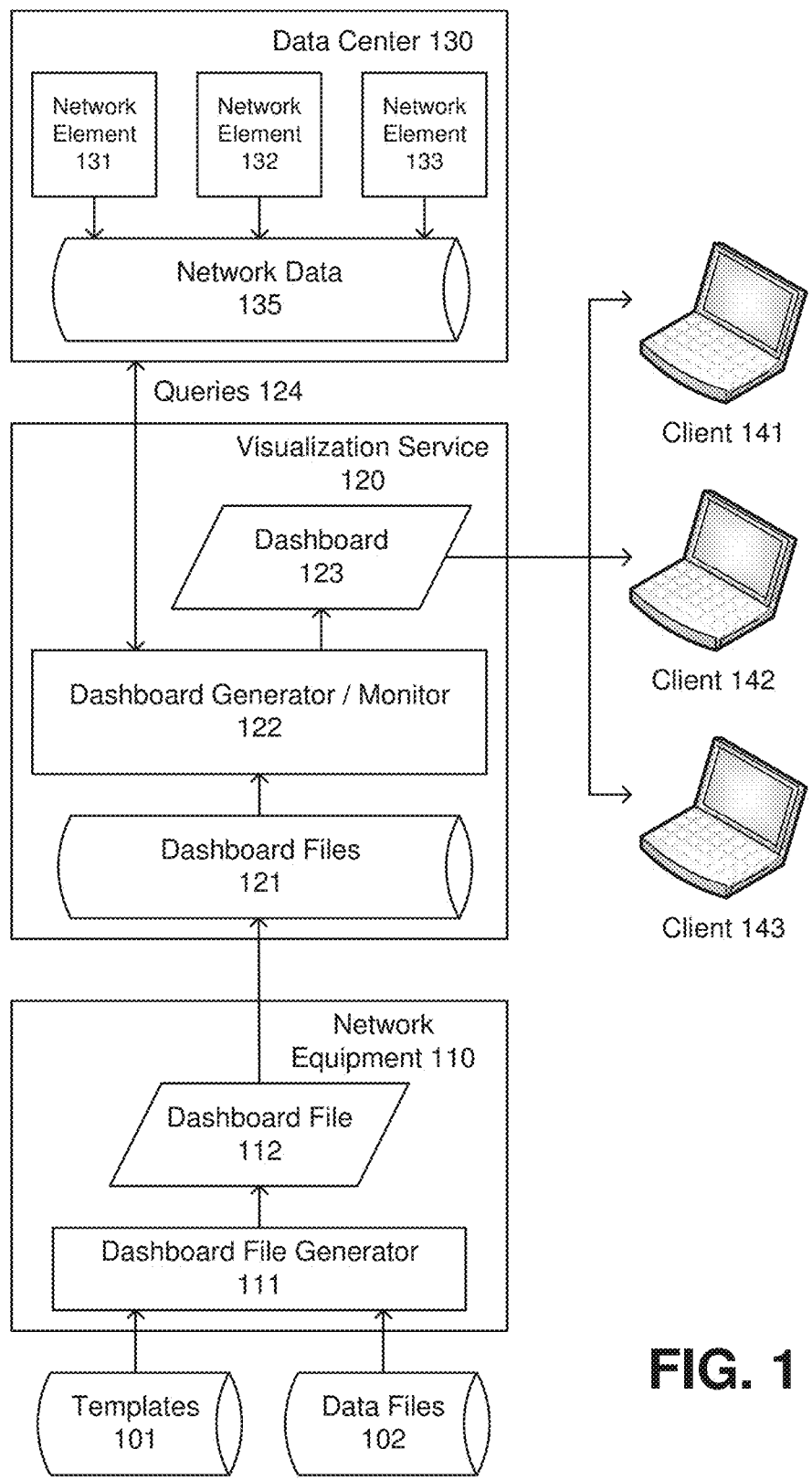
FIG. 1 illustrates an example architecture in which network equipment generates a dashboard file according to the techniques described herein, and the network equipment provides the dashboard file to a visualization service, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards automated generation of network data visualization dashboards. Automation can be achieved through the use of templates and data files. A template can be combined with any of multiple different data files to produce a network data visualization dashboard file. Different combinations of the template and the different data files can result in different network data visualization dashboard files. The network data visualization dashboard files can be provided to a data visualization tool, platform, or service, which can generate network data visualization dashboards according to received network data visualization files. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other next generation network implementations, as the techniques can also be applied, for example, in third generation (3G), or other wireless systems, as well as in wired networks. In this regard, aspects or features of the disclosed embodiments can be exploited in connection with substantially any wired or wireless communication technology. Wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in connection with legacy telecommunication technologies as well as wired networks.

FIG. 1 illustrates an example architecture in which network equipment generates a dashboard file according to the techniques described herein, and the network equipment provides the dashboard file to a visualization service, in accordance with various aspects and embodiments of the subject disclosure. FIG. 1 includes templates 101, data files 102, network equipment 110, a visualization service 120, a data center 130, and clients 141, 142, and 143. The network equipment 110 includes a dashboard file generator 111 and a dashboard file 112. The visualization service 120 includes dashboard files 121, dashboard generator/monitor 122, and a dashboard 123. The data center 130 comprises network elements 131, 132, and 133, and network data 135.

In example operations according to FIG. 1, the network equipment 110 can be configured to combine a template of templates 101 with a data file of data files 102 to generate the dashboard file 112. The network equipment 110 can provide the dashboard file 112 to the visualization service 120. The visualization service 120 can store the dashboard file 112 among the dashboard files 121, and the visualization service 120 can be configured to use the dashboard file 112 to generate a dashboard 123. The visualization service 120 can support viewing of the dashboard 123, and optionally modification of, or interaction with, the dashboard 123 by clients 141, 142, and 143.

The dashboard 123 can comprise visual representations of network data 135. The dashboard 123 can be generated by the visualization service 120 using the dashboard file 112 and queries 124 to the data center 130. The dashboard file 112 can specify various panels for inclusion in the dashboard 123, and properties of each panel. The queries 124 can be used to retrieve network data 135 designated for use in rendering the panels of the dashboard 123 according to the properties specified in the dashboard file 112. For example, the queries 124 can retrieve network data 135 which can be used to build graphs, charts, or other visualizations, according to the properties specified in the dashboard file 112.

As noted above, the network equipment 110 can be configured to combine a template of templates 101 with a data file of data files 102 to generate the dashboard file 112. The dashboard file generator 111 can be configured to perform the combination of a template with a data file. For example, the dashboard file generator 111 can receive, via a user interface, an input template, an input data file, and an instruction to use the inputs to generate the dashboard file 112.

An input template of templates 101 can comprise, e.g., a template that can combined with any of multiple different data files, in order to generate differently configured instances of the dashboard file 112. Different instances of the dashboard file 112, when provided to the visualization service 120, can be used to generate different respective instances of the dashboard 123.

A template can comprise different respective template panels, wherein the different respective template panels comprise different respective fixed panel properties and different respective customizable panel properties. Some example fixed panel properties can include panel position within a dashboard, panel size and shape, colors used for different data elements in a panel, and fixed words or information presented within a panel. Customizable panel properties can be designated within a template using a customizable property indicator, such as brackets { . . . }, or any other indicator, wherein an identification of a customizable property can be placed inside the brackets.

In order to generate the dashboard file 112, the dashboard file generator 111 can customize the customizable panel properties of a template by inserting corresponding data from a data file. A data file can list data for use with different identifications of customizable properties that are included within a template. The dashboard file generator 111 can scan a template for customizable property indicators, such as the brackets { . . . }, identify corresponding customizable property identifications within the template, and replace the customizable property identifications of the template with data listed in a data file. The resulting dashboard file 112 comprises a combination of a template with inserted data from a data file.

Some example customizable panel properties can comprise, e.g., network data parameters and parameter formulations. Network data parameters can include, e.g., network addresses of network elements 131, 132, 133, so that data associated with customized network addresses can be included in a dashboard 123 panel. Network data parameters can also include customized query formulations/query parameters for queries 124. Network data parameters can also include customized threshold information that can be used to set customized alert thresholds for a dashboard 123 panel.

The visualization service 120 can be configured to use the dashboard file 112 to generate the dashboard 123. The visualization service 120 can perform the queries 124 as specified in the dashboard file 112, to retrieve network data 135. The visualization service 120 can include retrieved network data 135, or visualizations thereof, in one or more panels of a dashboard 123, wherein panel properties are specified in the dashboard file 112. The panel properties of the dashboard 123 can include the fixed panel properties from a template, as well as the customizable panel properties indicated in a template and customized according to a data file.

Figure 2:
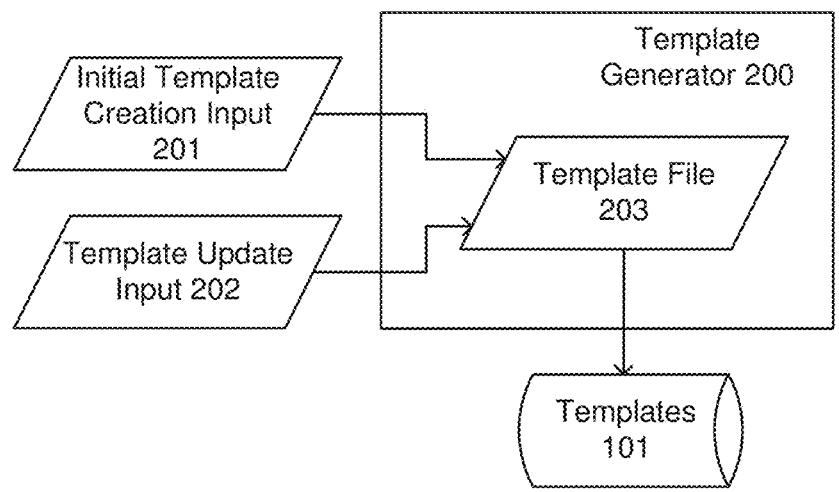
FIG. 2 illustrates an example template generator adapted to generate templates for use by a dashboard file generator, in accordance with various aspects and embodiments of the subject disclosure.

FIG. 2 illustrates an example template generator adapted to generate templates for use by a dashboard file generator, in accordance with various aspects and embodiments of the subject disclosure. FIG. 2 comprises a template generator 200, initial template creation input 201, template update input 202, template file 203, and templates 101. The template generator 200 can use initial template creation input 201 and/or template update input 202, along with user edits or other inputs, to create the template file 203. The template file 203 can be stored among the templates 101 introduced in FIG. 1.

The template generator 200 can employ any degree of automation to assist with generating the template file 203. At a lowest level of automation, the template generator 200 can comprise a text editor that allows users to manually create the template file 203. At higher levels of automation, the template generator 200 can use the initial template creation input 201 and/or the template update input 202 to automatically generate the template file 203, and the template generator 200 can allow for subsequent user review and editing of the template file 203.

In some embodiments, the template creation input 201 and/or template update input 202 can comprise data from a previously used template or data from a previously used dashboard file. The previous template or dashboard file can be modified as appropriate, resulting in the new template file 203. In some embodiments, the template generator 200 can be configured to automatically replace designated elements of a previously used dashboard file with, e.g., customizable property indicators, and the customizable property indicators can be reviewed, updated and confirmed by an operator.

Figure 3:
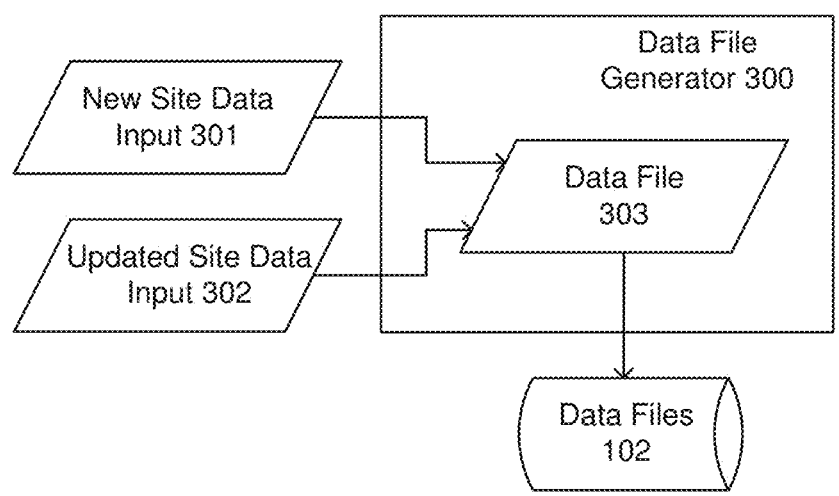
FIG. 3 illustrates an example data file generator adapted to generate data files for use by a dashboard file generator, in accordance with various aspects and embodiments of the subject disclosure.

FIG. 3 illustrates an example data file generator adapted to generate data files for use by a dashboard file generator, in accordance with various aspects and embodiments of the subject disclosure. FIG. 3 comprises a data file generator 300, new site data input 301, updated site data input 302, data file 303, and data files 102. The data file generator 300 can use new site data input 301 and/or updated site data input 302, along with user edits or other inputs, to create the data file 303. The data file 303 can be stored among the data files 102 introduced in FIG. 1.

Similar to the template generator 200, the data file generator 300 can employ any degree of automation to assist with generating the data file 303. At a lowest level of automation, the data file generator 300 can comprise a text editor that allows users to manually create the data file 303. At higher levels of automation, the data file generator 300 can use the new site data input 301 and/or the updated site data input 302 to automatically generate the data file 303, and the data file generator 300 can allow for subsequent user review and editing of the data file 303.

In some embodiments, the new site data input 301 and/or the updated site data input 302 can comprise site data from a data center 130. The new site data input 301 and/or the updated site data input 302 can comprise, e.g., network addresses of network elements 131, 132, 133 and/or other network parameters based on properties of the data center 130, network elements 131, 132, 133, and/or network data 135.

In some embodiments, the template generator 200 and the data file generator 300 can be included at the network equipment 110 introduced in FIG. 1. In other embodiments, the template generator 200 and the data file generator 300 can be implemented at any other connected device(s) that are adapted to store templates and data files in templates 101 and data files 102, or to otherwise provide templates and data files to network equipment.

FIG. 4 illustrates an example template file comprising fixed panel properties and customizable panel properties, in accordance with various aspects and embodiments of the subject disclosure. FIG. 4 includes a template file 400. The template file 400 can comprise a template identification (ID) and respective panels, e.g., panel 1, panel 2 and panel 3. Each respective panel can comprise respective fixed properties and respective customizable properties.

In FIG. 4, properties of panel 1 include an example fixed panel property A; an example customizable panel property comprising parameter formulation BC; an example fixed panel property D; an example customizable panel property comprising parameter formulation EF; an example fixed panel property G combined with a customizable panel property comprising parameter H, and further combined with fixed panel property I, and further combined with a customizable panel property comprising parameter H; and an example fixed panel property K combined with a customizable panel property comprising parameter L. In FIG. 4, the customizable panel properties are designated using brackets { . . . } as an indicator, however, it will be appreciated that other symbols or indicators can be used as customizable property indicators.

Properties of panel 2 include an example fixed panel property M; an example customizable panel property comprising parameter formulation CE; an example fixed panel property N; and an example customizable panel property comprising parameter formulation BF. Panel 3 and any further panels can include any further fixed or customizable properties as appropriate.

FIG. 5 illustrates an example data file comprising parameters for insertion into a template file in order to generate a dashboard file, in accordance with various aspects and embodiments of the subject disclosure. FIG. 5 includes a data file 500. The data file 500 can comprise a data file ID and network parameter values for each of the parameters included in the customizable panel properties of the template file 400.

In FIG. 5, parameter B is provided as "intra-pod". Parameter C is provided as "10.67.14.148". Parameter E is provided as "C-AGG-LEAF-2A". Parameter F is provided as "ipv4". Parameter H is provided as "zrdm54bnamp01amp001". Parameter J is provided as "rdm541922e11". Parameter L is provided as, "10.67.14.140". The example parameter values in the data file 500 are some example of strings and numbers that can serve as parameter values, it will be appreciated that parameters can comprise any data as appropriate for particular embodiments.

Figure 6:
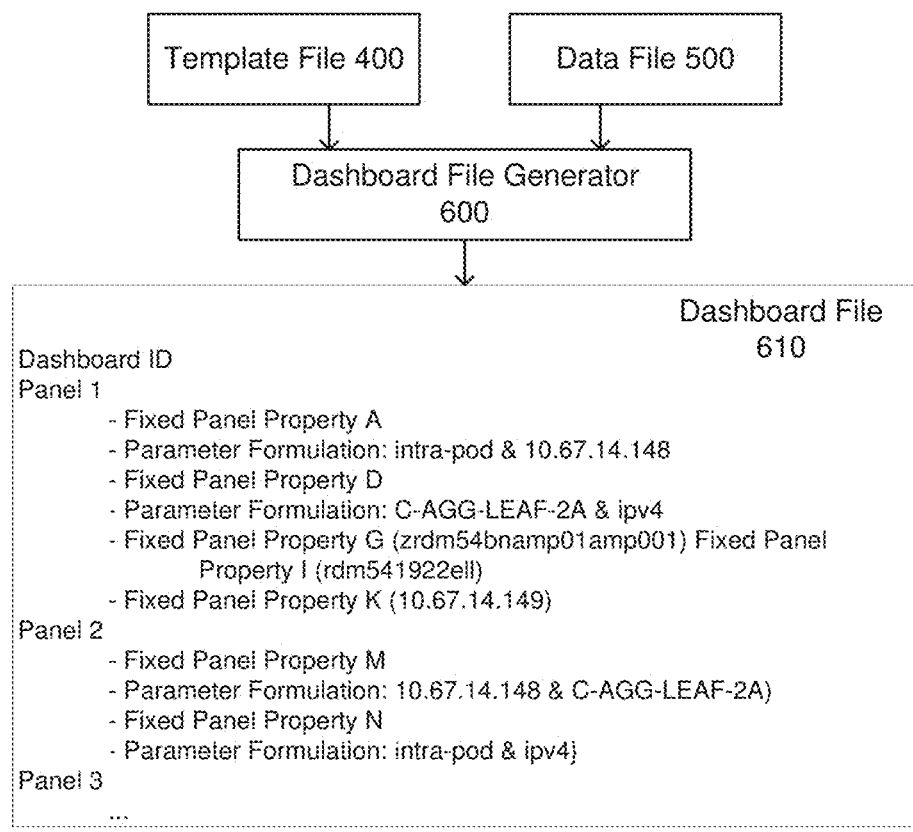
FIG. 6 illustrates an example dashboard file generator and example inputs and outputs thereof, in accordance with various aspects and embodiments of the subject disclosure.

FIG. 6 illustrates an example dashboard file generator and example inputs and outputs thereof, in accordance with various aspects and embodiments of the subject disclosure. FIG. 6 includes the template file 400 and the data file 500, introduced in FIG. 4 and FIG. 5. The template file 400 and the data file 500 are illustrated as inputs to a dashboard file generator 600. The dashboard file generator 600 can combine the template file 400 and the data file 500 to generate an output comprising a dashboard file 610. The dashboard file generator 600 can implement the dashboard file generator 111 introduced in FIG. 1, and the dashboard file 610 can implement the dashboard file 112 introduced in FIG. 1.

The example dashboard file 610 can comprise a dashboard ID and respective panels, namely, the panels defined by the template file 400. The panels can comprise fixed properties as defined in the template file 400, i.e., panel 1 can comprise fixed panel property A, fixed panel property D, and so on, as included in the template file 400; panel 2 can comprise fixed panel property M, and fixed panel property N as included in the template file 400; and panel 3 and any further panels can also include any fixed panel properties defined in the template file 400.

The respective panels in the dashboard file 610 can further comprise customized panel properties which are combinations of the customizable panel properties included in the template file 400 and corresponding data from the data file 500. For example, the panel 1 can include a parameter formulation of "intra-pod" (which was the value of parameter B in the data file 500), and "10.67.14.148" (which was the value of parameter C in the data file 500). Panel 1 can include another parameter formulation of "C-AGG-LEAF-2A" (which was the value of parameter E in the data file 500), and "ipv4" (which was the value of parameter F in the data file 500). Panel 1 can furthermore include the combination of fixed panel property G along with "zrdm54bnamp01amp001" (which was the value of parameter H in the data file 500) and further combined with fixed panel property I and "rdm541922e11" (which was the value of parameter J in the data file 500). Panel 2 can include a parameter formulation of "10.67.14.148" (which was the value of parameter C in the data file 500), and "C-AGG-LEAF-2A" (which was the value of parameter E in the data file 500). Panel 2 can furthermore include a parameter formulation of "intra-pod" (which was the value of parameter B in the data file 500), and "ipv4" (which was the value of parameter F in the data file 500).

Parameter formulations in the example dashboard file 610 are illustrated as "and" formulations in FIG. 6 for simplicity, however, parameter formulations can comprise any mathematical or logical formulation, including, e.g., "or", "if", "else" type operations and mathematical combinations such as additions, subtractions, multiplications, divisions, or functions that can use the parameters as variables.

In one example, a fixed query type can be combed with inserted via a customized panel property, to define the final query. The inserted data can specify, e.g., an IP address or other identification of a network element for which the query can be performed. More complex queries can be created via combinations of multiple fixed panel properties and data inserted as custom panel properties. In another example, an alert threshold for a panel can be set using a combined fixed panel property and an alert level that is set via a custom panel property.

Figure 7:
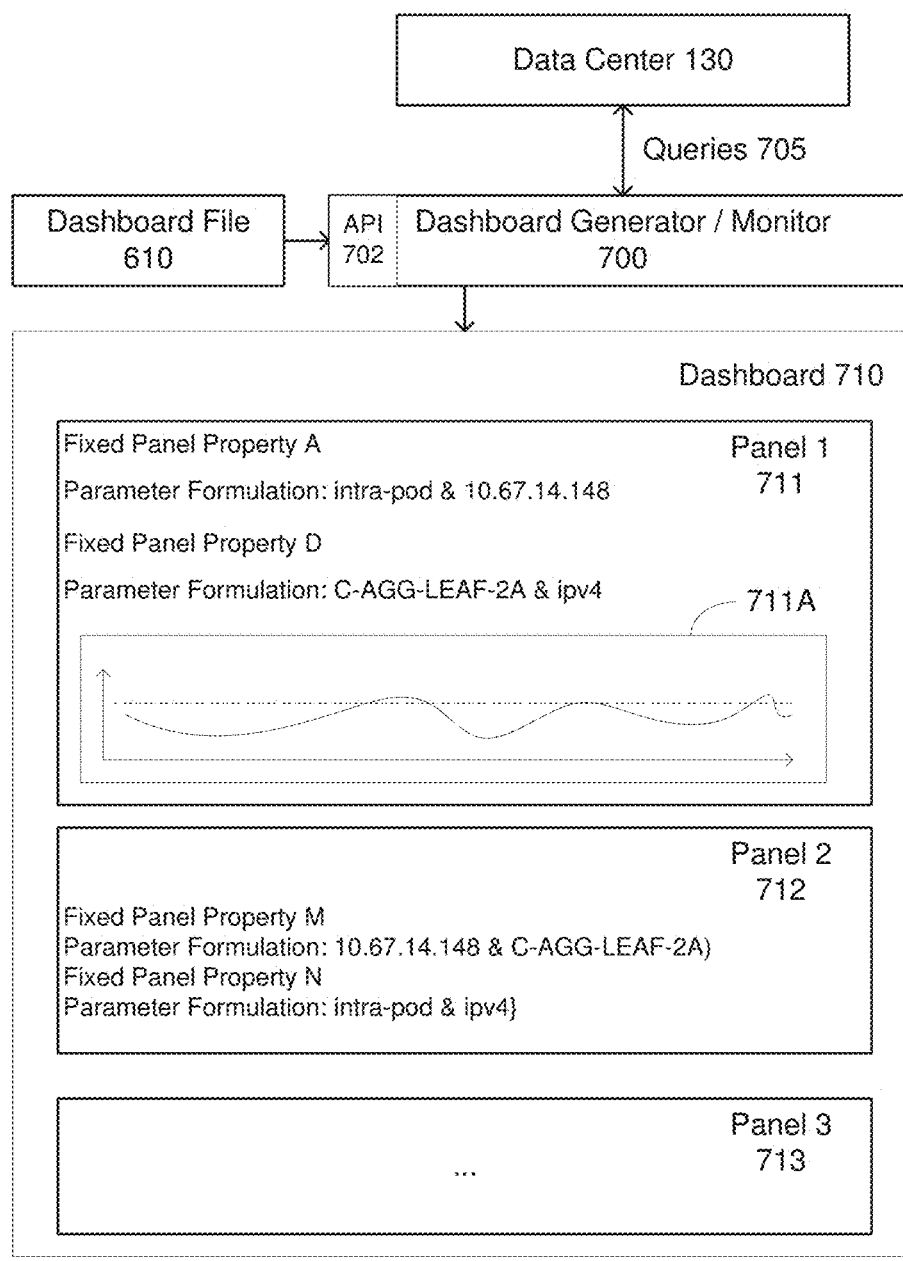
FIG. 7 illustrates an example dashboard generator and example inputs and outputs thereof, in accordance with various aspects and embodiments of the subject disclosure.

FIG. 7 illustrates an example dashboard generator and example inputs and outputs thereof, in accordance with various aspects and embodiments of the subject disclosure. FIG. 7 includes the dashboard file 610 introduced in FIG. 6, a dashboard generator/monitor 700 comprising an application programming interface (API) 702, the data center 130 introduced in FIG. 1, and a dashboard 710.

The dashboard generator/monitor 700 can implement, e.g., the dashboard generator/monitor 122 of the visualization service 120 introduced in FIG. 1. In FIG. 7, the dashboard generator/monitor 700 can optionally receive the dashboard file 610 (e.g., from network equipment 110) via the API 702, and the dashboard generator/monitor 700 can perform queries 705 to retrieve data for inclusion in an output dashboard 710 generated based on the dashboard file 610. The dashboard 710 can comprise, e.g., a dashboard such as dashboard 123 introduced in FIG. 1. The dashboard 710 can include respective panels, e.g., panel 1 711, panel 2 712, and panel 3 713, as defined by the dashboard file 610. The panels can each include fixed panel properties and customized panel properties as defined by the dashboard file 610. The panels can furthermore include data visualizations based on data retrieved by the queries 705 defined in the dashboard file 610.

In the example illustrated in FIG. 7, panel 1 includes fixed panel property A, a parameter formulation of "intra-pod", and "10.67.14.148", fixed panel property D, and a parameter formulation of "C-AGG-LEAF-2A" and "ipv4", all of which will be recognized as part of the dashboard file 610. Similarly, panel 1 includes a visualization 711, e.g., a chart or graph, which can be based for example on the combination of fixed panel property G, zrdm54bnamp01amp001, fixed panel property I, and rdm541922e11, as well as on the combination of fixed panel property K and 10.67.14.149, and network data retrieved by corresponding queries 705, according to the dashboard file 610. Panel 2 includes fixed panel property M, a parameter formulation of "10.67.14.148" and "C-AGG-LEAF-2A", fixed panel property N, and a parameter formulation of "intra-pod" and "ipv4", all of which will be recognized as part of the dashboard file 610.

In some example methods according to this disclosure, data center 130 monitoring by a visualization service 120, such as Grafana dashboards or others, can be enabled in a network of newly integrated or updated data centers. Methods can use data provided in data files to automatically generate appropriate dashboards. The specific example of creating dashboards for an intra-pod topology can be provided, though disclosed methods work for a wide variety of network topologies.

Network elements in a data center 130 can produce a large volume of network data, including measurement data and other data. Dashboards can be used to monitor, display, and alert on this network data. Any given data center 130 may require dozens or hundreds of these dashboards. Therefore, automating dashboard creation according to the techniques disclosed herein is advantageous to create dashboards more efficiently and accurately.

Some embodiments may include updating dashboard files, such as dashboard file 610, for a given data center 130. A network provider may need to update the structure and details of their dashboards and may therefore repeat the process of dashboard generation. Also, the elements within a data center 130 can change over time. In some embodiments, data center 130 changes can be detected and can trigger an automated update of a data file and a corresponding automated update of a dashboard file 610 and dashboard 710.

Embodiments of this disclosure can streamline the process of dashboard generation, providing savings to the network provider. In some embodiments, tooling can be used to reduce the effort involved in creating the initial set of dashboards for a data center 130, as well as the effort required to update dashboards after changes to the data center 130. The tooling can eliminate the probability of human error that exists in manual dashboard generation.

In some embodiments, the dashboard file generator 111 can be implemented as a computer program that takes as input, first, a set of templates 101 containing the structure of desired dashboards and, second a data file (e.g., from data files 102) that provides detailed data to be combined with the templates in order to create (and optionally install) valid dashboards.

Example operations can proceed in two phases: preparation and generation. Preparation can entail the creation of the templates 101 that can be used during generation. These templates 101 can resemble dashboards but need not be, in and of themselves, valid dashboards. The templates 101 can comprise global parts as well as repeating parts, and they can contain tags such as "{{tag-name}}" which can be substituted with actual data during generation. The templates 101 can be created in advance of their need.

Next, generation can occur in response to an instruction to generate a new set of dashboards. This can happen when (for example) a new data center 130 is configured, or when an existing set of dashboards needs to be updated based on changes in a cellular network. Generation can entail running the dashboard file generator 111 which combines the templates 101 created during preparation with a new or updated data file. The tags within the templates 101 can be substituted with the data in the new data file, repeating sections can be created and populated as required, and a new set of valid dashboard files e.g., dashboard file 112, can be produced. These new dashboard files, such as dashboard file 112 may then await human inspection or can be automatically installed into a target system—for example, into a visualization service 120, optionally via an API.

To make the templates 101 that are produced as part of preparation stage, any text editor can optionally be used, as the templates are text files. Existing dashboards may be used as the starting point by exporting them from the visualization service 120. Using any text editor, specific instances of data in the templates 101 can be changed to contain tags of the form "{{tag-name}}" in order to make the templates generic. Tags such as "{{ip-version}}" and "{{session-desc}}" can indicate where data from the data file is to be substituted: Additional comments can be added to the templates where necessary in order to demarcate repeating sections.

To make the dashboard file generator 111, any programming language may be used. The operation of the dashboard file generator 111 can be per standard text processing capabilities such as reading and writing ASCII files and doing parameter substitutions. Some implementations can be coded via Node.js (JavaScript) but any general-purpose programming language may be used, such as Python, Java, etc.

An example process can include, first, creating a dashboard file generator 111 and the dashboard templates 101. Next, for a new data center, a data file can be received which describes the data center topology. The dashboard file generator 111 can be executed, using the templates 101 and data file for the new data center as inputs. The resulting dashboard files can be installed into the visualization service 120. Finally, for changes to a dashboard template or data center data file, a subsequent data file can be received and the subsequent data file can trigger template updates, other data file updates, regeneration of the dashboard file(s) 112 and re-installation the produced dashboard files) into the visualization service.

Figure 8:
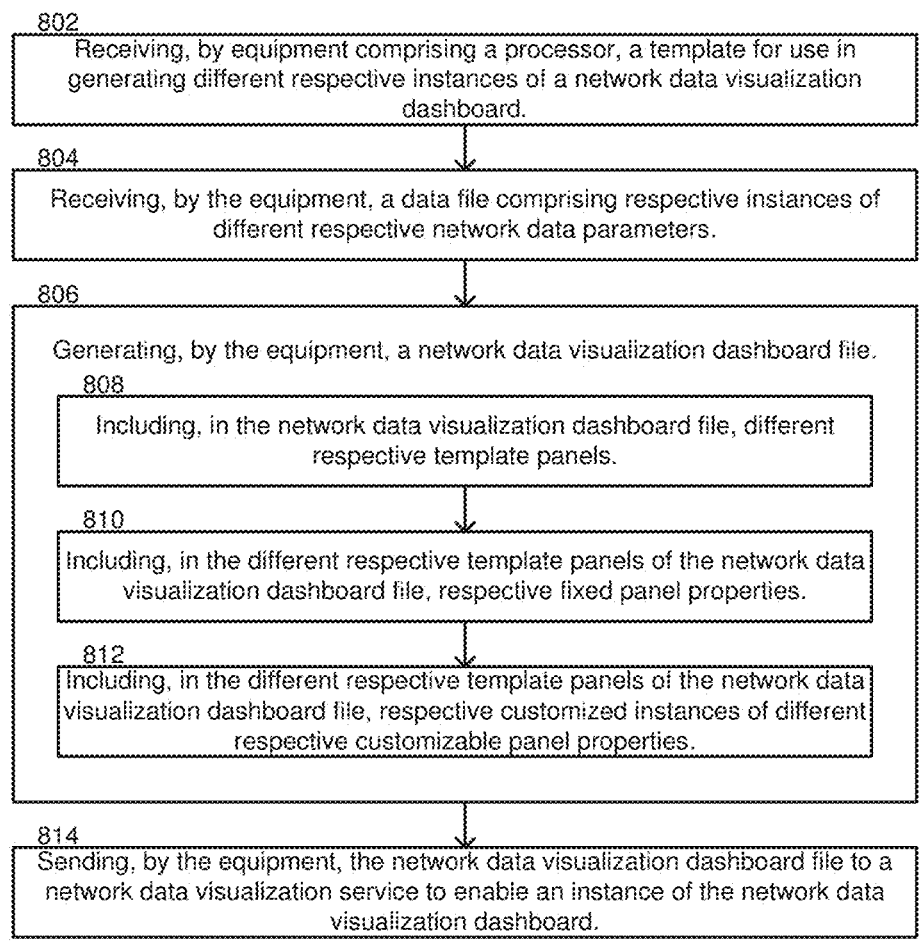
FIG. 8 is a flow diagram representing example operations of a computing device in connection with generating a network data visualization dashboard file, in accordance with various aspects and embodiments of the subject disclosure.

FIG. 8 is a flow diagram representing example operations of a computing device in connection with generating a network data visualization dashboard file, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by a computing device such as the network equipment 110 illustrated in FIG. 1. Example operation 802 comprises receiving, by equipment 110 comprising a processor, a template, e.g., from templates 101, for use in generating different respective instances of a network data visualization dashboard 123. The template can comprise different respective template panels, wherein the different respective template panels comprise different respective fixed panel properties and different respective customizable panel properties.

The different respective customizable panel properties can optionally be designated within the template using, e.g., a customizable property indicator as illustrated in FIG. 4. The different respective customizable panel properties can comprise, for example, different respective network data parameter formulations that are able to be combined with different respective network data parameters to customize the different respective template panels. In some embodiments, at least one of the different respective customizable panel properties can comprise a network data query formulation that is able to be combined with a query parameter combination to customize a respective template panel of the different respective template panels. Furthermore, in some embodiments, at least one of the different respective customizable panel properties can comprise a monitoring threshold formulation that is able to be combined with a monitoring threshold parameter to customize a respective template panel of the different respective template panels.

Example operation 804 comprises receiving, by the equipment 110, a data file, e.g., from data files 102, the data file comprising respective instances of different respective network data parameters. The data file can comprise for example, an instance of a query parameter combination, an instance of a monitoring threshold parameter, or instances of any other network data parameters.

Example operation 806 comprises generating, by the equipment 110, a network data visualization dashboard file 112. Generating the network data visualization dashboard file 112 can comprise operations 808, 810 and 812. Example operation 808 comprises including, in the network data visualization dashboard file 112, different respective template panels. Example operation 810 comprises including, in the different respective template panels of the network data visualization dashboard file 112, respective fixed panel properties, e.g., fixed panel properties included in the template file. Example operation 812 comprises including, in the different respective template panels of the network data visualization dashboard file 112, respective customized instances of different respective customizable panel properties. Respective customized instances of the different customizable panel properties can comprise, e.g., respective ones of the different respective network data parameter formulations combined with respective instances of respective network data parameters from the data file.

In some embodiments, including, in the different respective template panels, respective customized instances of the different respective customizable panel properties at operation 812 can comprise identifying instances of a customizable property indicator within the template. In some embodiments, generating the network data visualization dashboard file 112 can also comprise including, in a respective template panel, a network data query formulation combined with an instance of a query parameter combination. Furthermore, generating the network data visualization dashboard file 112 can further comprise including, in a respective template panel, a monitoring threshold formulation combined with an instance of a monitoring threshold parameter.

Example operation 814 comprises sending, by the equipment 110, the network data visualization dashboard file 112 to a network data visualization service 120 to enable an instance of the network data visualization dashboard 123.

Figure 9:
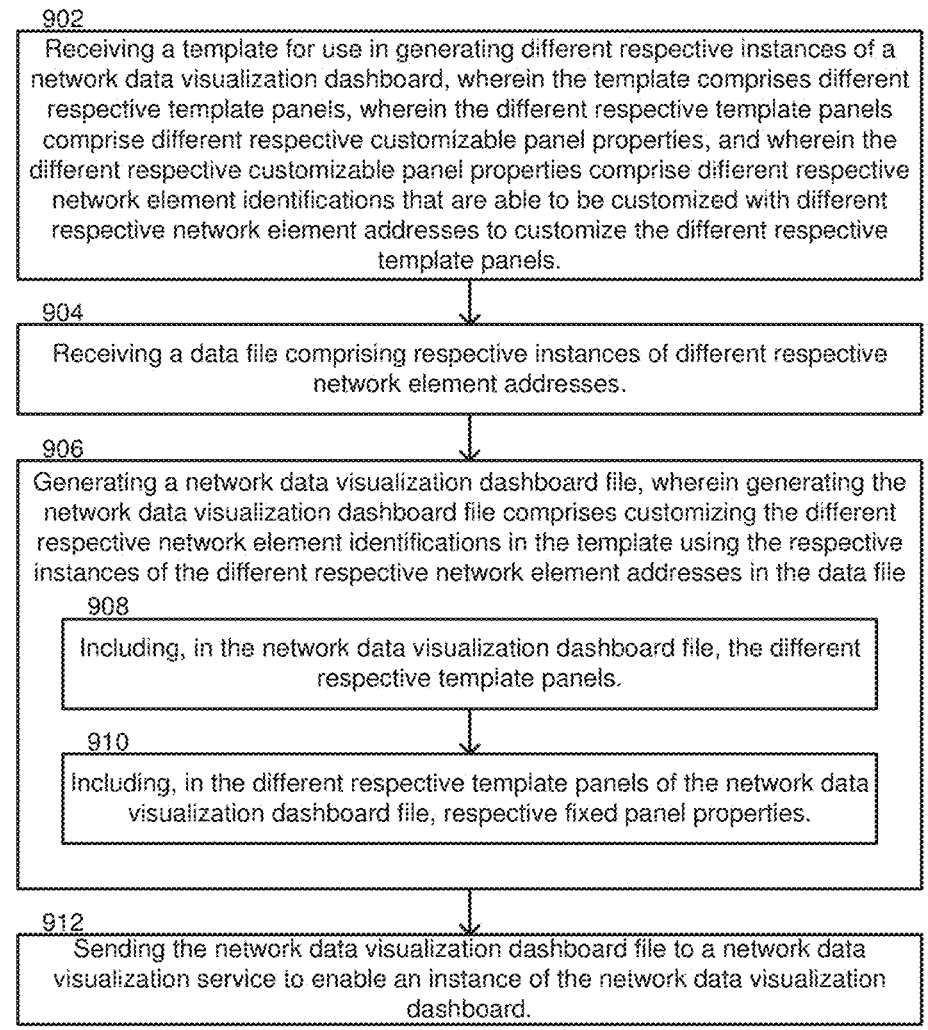
FIG. 9 is a flow diagram representing another set of example operations of a computing device in connection with generating a network data visualization dashboard file, in accordance with various aspects and embodiments of the subject disclosure.

FIG. 9 is a flow diagram representing another set of example operations of a computing device in connection with generating a network data visualization dashboard file, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by a computing device such as the network equipment 110 illustrated in FIG. 1. Example operation 902 comprises receiving a template (e.g., a template of templates 101) for use in generating different respective instances of a network data visualization dashboard 123, wherein the template comprises different respective template panels, wherein the different respective template panels comprise different respective customizable panel properties, and wherein the different respective customizable panel properties comprise different respective network element identifications that are able to be customized with different respective network element addresses to customize the different respective template panels. The different respective network element identifications can comprise, e.g., identifications of network elements 131, 132, 133 at a data center 130.

In some embodiments, the different respective customizable panel properties included in the template can further comprise at least one network data query formulation that is able to be combined with a query parameter combination in a data file to customize a respective template panel of different respective template panels in a network data visualization dashboard file 112. In some embodiments, the different respective customizable panel properties included in the template can further comprise at least one monitoring threshold formulation that is able to be combined with a monitoring threshold parameter in a data file to customize a respective template panel of different respective template panels in a network data visualization dashboard file 112.

Example operation 904 comprises receiving a data file (e.g., a data file of data files 102) comprising respective instances of the different respective network element addresses, i.e., network element addresses that can be used to customize the network element identifications included in the template.

Example operation 906 comprises generating a network data visualization dashboard file 112, wherein generating the network data visualization dashboard file 112 comprises customizing the different respective network element identifications in the template using the respective instances of the different respective network element addresses in the data file.

Generating the network data visualization dashboard file 112 at operation 906 can further comprise operations 908 and 910. Example operation 908 comprises including, in the network data visualization dashboard file 112, the different respective template panels, i.e., the template panels included in the template. Example operation 910 comprises including, in the different respective template panels of the network data visualization dashboard file 112, respective fixed panel properties, i.e., the fixed panel properties included in the template.

Example operation 912 comprises sending the network data visualization dashboard file 112 to a network data visualization service 120 to enable an instance of the network data visualization dashboard 123. The network data visualization service 120 can be configured generate the instance of the network data visualization dashboard 123 by retrieving, e.g., using queries 124, network data from the different respective network element addresses in the network data visualization dashboard file 112.

Figure 10:
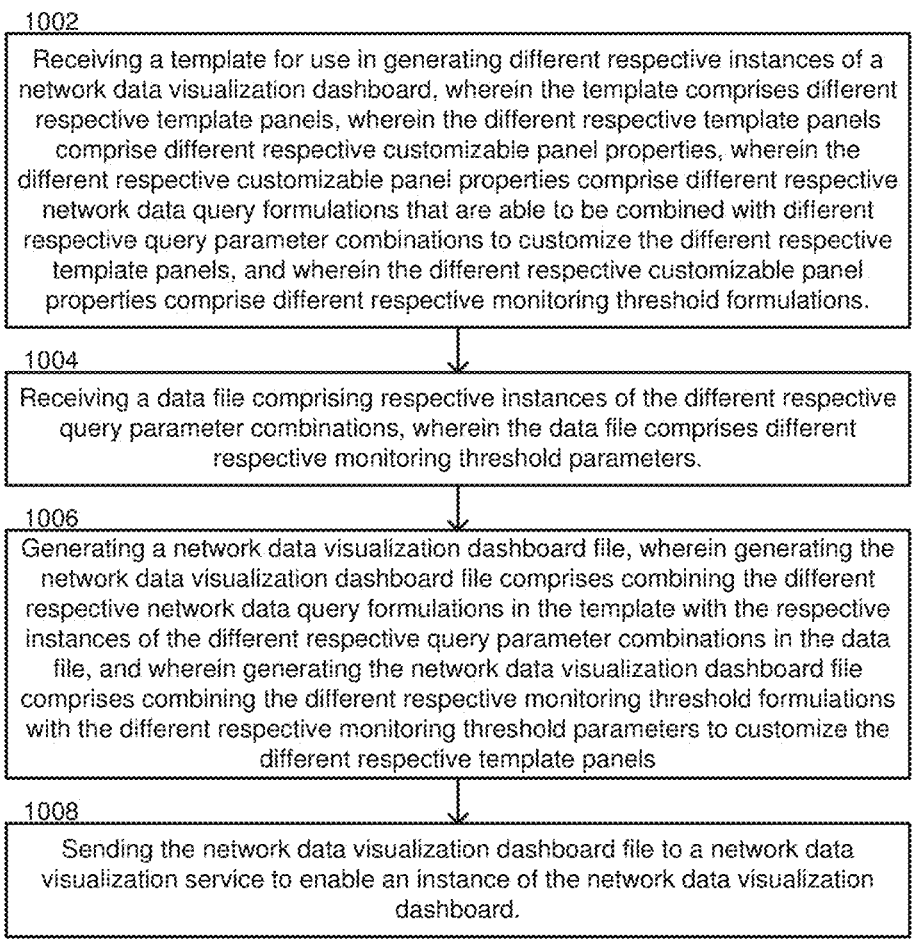
FIG. 10 is a flow diagram representing another set of example operations of a computing device in connection with generating a network data visualization dashboard file, in accordance with various aspects and embodiments of the subject disclosure.

FIG. 10 is a flow diagram representing another set of example operations of a computing device in connection with generating a network data visualization dashboard file, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 10 can be performed, for example, by a computing device such as the network equipment 110 illustrated in FIG. 1. Example operation 1002 comprises receiving a template (e.g., a template of templates 101) for use in generating different respective instances of a network data visualization dashboard 123, wherein the template comprises different respective template panels, wherein the different respective template panels comprise different respective customizable panel properties, wherein the different respective customizable panel properties comprise different respective network data query formulations that are able to be combined with different respective query parameter combinations to customize the different respective template panels, and wherein the different respective customizable panel properties can also optionally comprise different respective monitoring threshold formulations.

Example operation 1004 comprises receiving a data file (e.g., a data file of data files 102) comprising respective instances of the different respective query parameter combinations, wherein the data file can also optionally comprise different respective monitoring threshold parameters.

Example operation 1006 comprises generating a network data visualization dashboard file 112, wherein generating the network data visualization dashboard file 112 comprises combining the different respective network data query formulations in the template with the respective instances of the different respective query parameter combinations in the data file, and wherein generating the network data visualization dashboard file can also optionally further comprise combining the different respective monitoring threshold formulations with the different respective monitoring threshold parameters to customize the different respective template panels.

Example operation 1008 comprises sending the network data visualization dashboard file 112 to a network data visualization service 120 to enable an instance of the network data visualization dashboard 123. In some embodiments, sending the network data visualization dashboard file 112 to the network data visualization service 120 can comprise sending the network data visualization dashboard file 112 via a network data visualization service application programming interface, e.g., as illustrated in FIG. 7.

In some embodiments, the network data visualization service 120 can be configured to monitor network data by repetitively running queries 124 comprising the different respective network data query formulations combined with the respective instances of the different respective query parameter combinations, and to generate graphs comprising visual representations of query results. The network data visualization service 120 can furthermore optionally be configured to generate an alert when data in a panel according to the instance of the network data visualization dashboard 123 exceeds a monitoring threshold comprising a combination of a respective monitoring threshold formulation and a respective monitoring threshold parameter.

Figure 11:
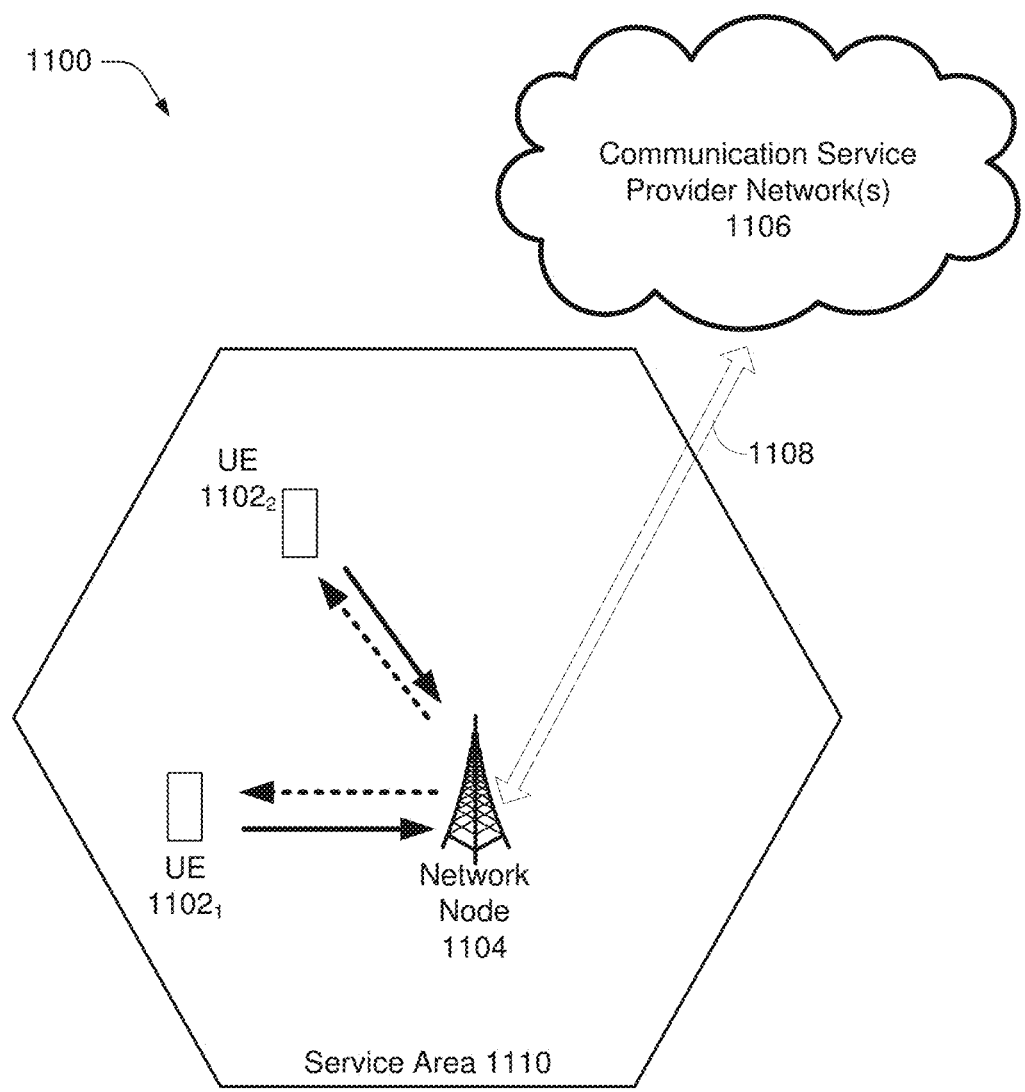
FIG. 11 illustrates an example network communication system, in accordance with various aspects and embodiments of the subject disclosure.

FIG. 11 illustrates a non-limiting example of a network communication system 1100 which can be used in connection with at least some embodiments of the subject disclosure. The illustrated network communication system 1100 is a cellular (wireless) communication system, however, embodiments of this disclosure can be adapted for use with any network data, whether the data is from a wired, wireless, or hybrid wired and wireless network. In one or more embodiments, system 1100 can comprise one or more user equipment UEs 11021, 11022, referred to collectively as UEs 1102, a network node 1104 that supports cellular communications in a service area 1110, also known as a cell, and communication service provider network(s) 1106.

The non-limiting term "user equipment" can refer to any type of device that can communicate with a network node 1104 in a cellular or mobile communication system 1100. UEs 1102 can have one or more antenna panels having vertical and horizontal elements. Examples of UEs 1102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1102 can also comprise IOT devices that communicate wirelessly.

In various embodiments, system 1100 comprises communication service provider network(s) 1106 serviced by one or more wireless communication network providers. Communication service provider network(s) 1106 can comprise a "core network". In example embodiments, UEs 1102 can be communicatively coupled to the communication service provider network(s) 1106 via network node 1104. The network node 1104 (e.g., network node device) can communicate with UEs 1102, thus providing connectivity between the UEs 1102 and the wider cellular network. The UEs 1102 can send transmission type recommendation data to the network node 1104. The transmission type recommendation data can comprise a recommendation to transmit data via a closed loop multiple input multiple output (MIMO) mode and/or a rank-1 precoder mode.

A network node 1104 can have a cabinet and other protected enclosures, computing devices, an antenna mast, and multiple antennas for performing various transmission operations (e.g., MIMO operations) and for directing/steering signal beams. Network node 1104 can comprise one or more base station devices which implement features of the network node 1104. Network nodes can serve several cells, depending on the configuration and type of antenna. In example embodiments, UEs 1102 can send and/or receive communication data via a wireless link to the network node 1104. The dashed arrow lines from the network node 1104 to the UEs 1102 represent downlink (DL) communications to the UEs 1102. The solid arrow lines from the UEs 1102 to the network node 1104 represent uplink (UL) communications.

Communication service provider networks 1106 can facilitate providing wireless communication services to UEs 1102 via the network node 1104 and/or various additional network devices (not shown) included in the one or more communication service provider networks 1106. The one or more communication service provider networks 1106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 1100 can be or comprise a large-scale wireless communication network that spans various geographic areas. According to this implementation, the one or more communication service provider networks 1106 can be or comprise the wireless communication network and/or various additional devices and components of the wireless communication network (e.g., additional network devices and cell, additional UEs, network server devices, etc.).

The network node 1104 can be connected to the one or more communication service provider networks 1106 via one or more backhaul links 1108. For example, the one or more backhaul links 1108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1108 can also comprise wireless link components, such as but not limited to, line-of-sight (LOS) or non-LOS links which can comprise terrestrial air-interfaces or deep space links (e.g., satellite communication links for navigation). Backhaul links 1108 can be implemented via a "transport network" in some embodiments. In another embodiment, network node 1104 can be part of an integrated access and backhaul network. This may allow easier deployment of a dense network of self-backhauled 5G cells in a more integrated manner by building upon many of the control and data channels/procedures defined for providing access to UEs.

Network communication system 1100 can employ various cellular systems, technologies, and modulation modes to facilitate wireless radio communications between devices (e.g., the UE 1102 and the network node 1104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 1100 can operate in accordance with any 5G, next generation communication technology, or existing communication technologies, various examples of which are listed supra. In this regard, various features and functionalities of system 1100 are applicable where the devices (e.g., the UEs 1102 and the network device 1104) of system 1100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 12:
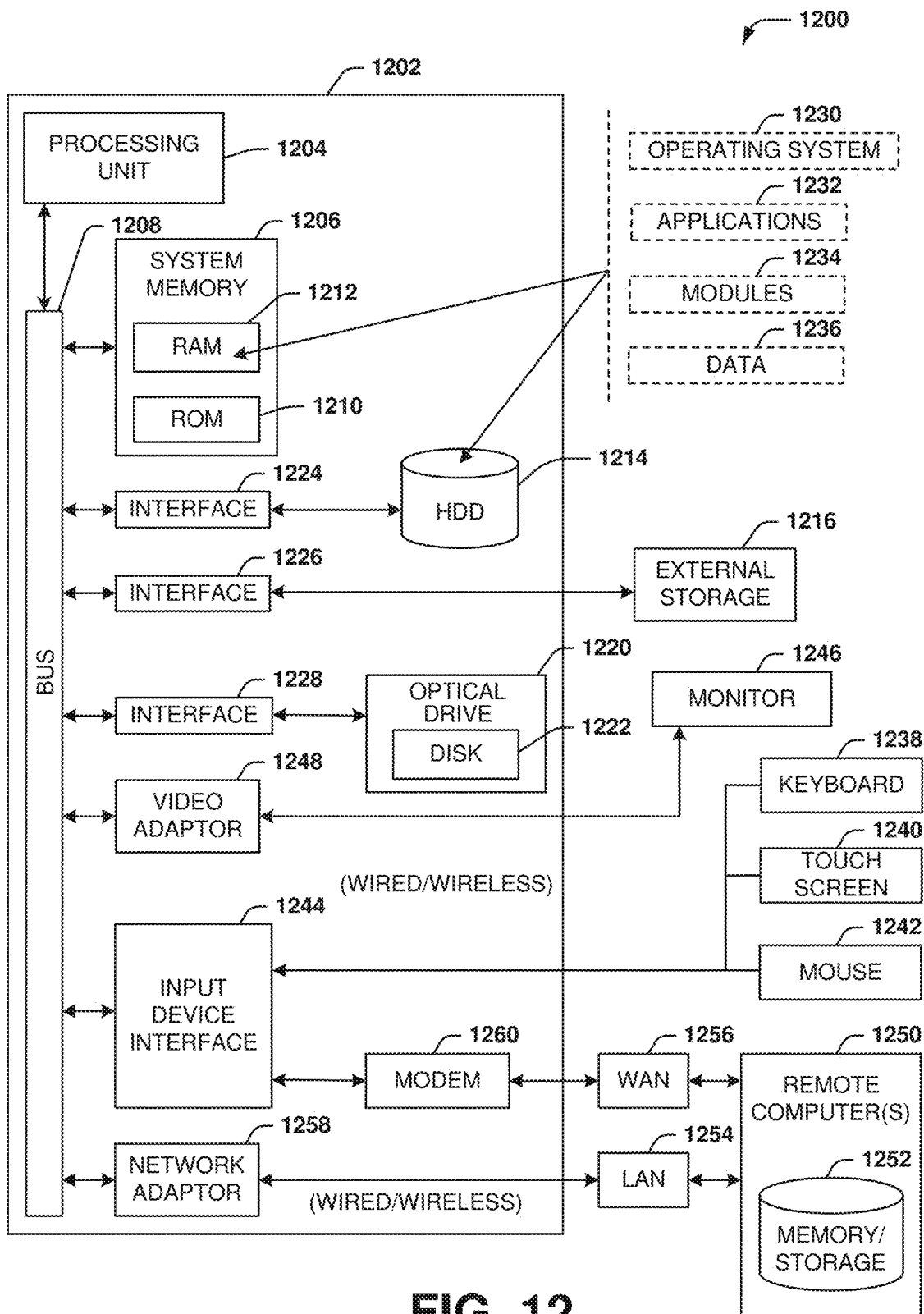
FIG. 12 is a block diagram of an example computer that can be operable to execute processes and methods in accordance with various aspects and embodiments of the subject disclosure.

FIG. 12 is a block diagram of an example computer that can be operable to execute processes and methods in accordance with various aspects and embodiments of the subject disclosure. The example computer can be adapted to implement, for example, any of the various network equipment described herein.

FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by equipment comprising a processor, a template for use in generating different respective instances of a network data visualization dashboard comprising a plurality of dashboard panels in which different network data retrieved from a data center comprising a plurality of network elements is displayed,
wherein the template comprises a plurality of template panels, each respective template panel of the plurality of template panels corresponding to one dashboard panel of the plurality of dashboard panels,
wherein each respective template panel of the plurality of template panels comprises a set of fixed panel properties of the one dashboard panel and a set of customizable panel properties of the one dashboard panel,
wherein the set of fixed panel properties includes at least one of: a position of the one dashboard panel within the network data visualization dashboard, a shape of the one dashboard panel, or a color used for a data element in the one dashboard panel, and
wherein the set of customizable panel properties comprises a network element identification of a network element of the data center that is able to be combined with different respective network element addresses of the plurality of network elements to customize the one dashboard panel;
receiving, by the equipment, a data file comprising respective instances of the different respective network element addresses;
generating, by the equipment, a network data visualization dashboard file, wherein the generating the network data visualization dashboard file comprises:
including, in the network data visualization dashboard file, the plurality of template panels;
including, in the each respective template panel of the plurality of template panels of the network data visualization dashboard file, a respective fixed panel property of the set of fixed panel properties; and
including, in the each respective template panel of the plurality of template panels of the network data visualization dashboard file, a customized instance of at least one customizable panel property of the set of customizable panel properties, wherein the customized instance of the at least one customizable panel property comprises the network element identification of the network element of the data center combined with an instance of the instances of the different respective network element addresses from the data file; and
sending, by the equipment, the network data visualization dashboard file to a network data visualization service to enable an instance of the network data visualization dashboard, wherein the network data visualization dashboard file causes the network data visualization service to query the data center for network data from the network element of the data center.

2. The method of claim 1, wherein the at least one customizable panel property of the set of customizable panel properties further comprises a network data query formulation that is able to be combined with a query parameter combination to further customize the one dashboard panel.

3. The method of claim 2, wherein the data file further comprises an instance of the query parameter combination.

4. The method of claim 3, wherein the generating the network data visualization dashboard file further comprises including, in the each respective template panel, the network data query formulation combined with the instance of the query parameter combination.

5. The method of claim 1, wherein the at least one customizable panel property of the set of customizable panel properties further comprises a monitoring threshold formulation that is able to be combined with a monitoring threshold parameter to further customize the one dashboard panel.

6. The method of claim 5, wherein the data file further comprises an instance of the monitoring threshold parameter.

7. The method of claim 6, wherein the generating the network data visualization dashboard file further comprises including, in the each respective template panel, the monitoring threshold formulation combined with the instance of the monitoring threshold parameter.

8. The method of claim 1, wherein the set of customizable panel properties is designated within the template using a customizable property indicator.

9. The method of claim 8, wherein the including, in the each respective template panel of the plurality of template panels, the customized instance of the at least one customizable panel property of the set of customizable panel properties comprises identifying instances of the customizable property indicator within the template.

10. The method of claim 1, wherein the generating the network data visualization dashboard file is automatically repeated by the equipment in response to an update to the data file being detected.

11. Network equipment, comprising:
a processor; and
a memory that stores executable instructions that, when executed by the processor, facilitate performance of operations, the operations comprising:
receiving a template for use in generating different respective instances of a network data visualization dashboard comprising a plurality of dashboard panels in which different network data retrieved from a data center comprising a plurality of network elements is displayed,
wherein the template comprises a plurality of template panels, each respective template panel of the plurality of template panels corresponding to one dashboard panel of the plurality of dashboard panels,
wherein each respective template panel of the plurality of template panels comprises a set of fixed panel properties of the one dashboard panel and a set of customizable panel properties of the one dashboard panel,
wherein the set of fixed panel properties includes at least one of: a position of the one dashboard panel within the network data visualization dashboard, a shape of the one dashboard panel, or a color used for a data element in the one dashboard panel, and
wherein the set of customizable panel properties comprises a network element identification of a network element of the data center that is able to be customized with different respective network element addresses of the plurality of network elements to customize the one dashboard panel;
receiving a data file comprising respective instances of the different respective network element addresses;
generating a network data visualization dashboard file, wherein the generating the network data visualization dashboard file comprises customizing the network element identification of the network element of the data center in the template using an instance of the respective instances of the different respective network element addresses in the data file; and
sending the network data visualization dashboard file to a network data visualization service to enable an instance of the network data visualization dashboard, wherein the network data visualization dashboard file causes the network data visualization service to query the data center for network data from the network element of the data center.

12. The network equipment of claim 11, wherein the generating the network data visualization dashboard file further comprises:
including, in the network data visualization dashboard file, the plurality of template panels; and
including, in the plurality of template panels of the network data visualization dashboard file, the respective fixed panel properties.

13. The network equipment of claim 11, wherein the set of customizable panel properties further comprises at least one network data query formulation that is able to be combined with a query parameter combination in the data file to customize the each respective template panel in the network data visualization dashboard file.

14. The network equipment of claim 11, wherein the set of customizable panel properties further comprises at least one monitoring threshold formulation that is able to be combined with a monitoring threshold parameter in the data file to customize the each respective template panel in the network data visualization dashboard file.

15. A non-transitory machine-readable medium, comprising executable instructions that, when executed by a processor, facilitate performance of operations, the operations comprising:
receiving a template for use in generating different respective instances of a network data visualization dashboard comprising a plurality of dashboard panels in which different network data retrieved from a data center comprising a plurality of network elements is displayed,
wherein the template comprises a plurality of template panels, each respective template panel of the plurality of template panels corresponding to one dashboard panel of the plurality of dashboard panels,
wherein each respective template panel of the plurality of template panels comprises a set of fixed panel properties of the one dashboard panel and a set of customizable panel properties of the one dashboard panel,
wherein the set of fixed panel properties includes at least one of: a position of the one dashboard panel within the network data visualization dashboard, a shape of the one dashboard panel, or a color used for a data element in the one dashboard panel, and
wherein the set of customizable panel properties comprises a network element identification of a network element of the data center that is able to be combined with different respective network element addresses of the plurality of network elements to customize the one dashboard panel;
receiving a data file comprising respective instances of the different respective network element addresses;
generating a network data visualization dashboard file, wherein the generating the network data visualization dashboard file comprises combining the network element identification of the network element of the data center in the template with the respective instances of the different respective network element addresses in the data file; and
sending the network data visualization dashboard file to a network data visualization service to enable an instance of the network data visualization dashboard, wherein the network data visualization dashboard file causes the network data visualization service to query the data center for network data from the network element of the data center.

16. The non-transitory machine-readable medium of claim 15, wherein the set of customizable panel properties further comprises different monitoring threshold formulations, wherein the data file further comprises different monitoring threshold parameters, and wherein the generating the network data visualization dashboard file further comprises combining the different monitoring threshold formulations with the different monitoring threshold parameters to customize the one dashboard panel.

17. The non-transitory machine-readable medium of claim 16, wherein the network data visualization service is configured to generate an alert when data in a panel according to the instance of the network data visualization dashboard exceeds a monitoring threshold comprising a combination of a monitoring threshold formulation and a monitoring threshold parameter.

18. The non-transitory machine-readable medium of claim 15, wherein the network data visualization service is configured to monitor network data by repetitively running queries comprising different network data element identifications combined with the instances of the different respective network element addresses, and to generate graphs comprising visual representations of query results.

19. The non-transitory machine-readable medium of claim 15, wherein the sending the network data visualization dashboard file to the network data visualization service comprises sending the network data visualization dashboard file via a network data visualization service application programming interface.

20. The method of claim 10, wherein the update to the data file is a result of a change in the plurality of network elements of the data center.

\* \* \* \* \*